W. DAY.
CULTIVATOR.

No. 87,151. Patented Feb. 23, 1869.

Witnesses.
C. Raettig
Wm A Morgan

Inventor.
W. Day.
per Munn & Co
Attys.

WILLIAM DAY, OF MORRISTOWN, NEW JERSEY.

Letters Patent No. 87,151, dated February 23, 1869.

IMPROVEMENT IN CULTIVATORS.

The Schedule referred to in these Letters Patent and making part of the same.

*To all whom it may concern:*

Be it known that I, WILLIAM DAY, of Morristown, in the county of Morris, and State of New Jersey, have invented a new and improved Cultivator; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

Figure 1:
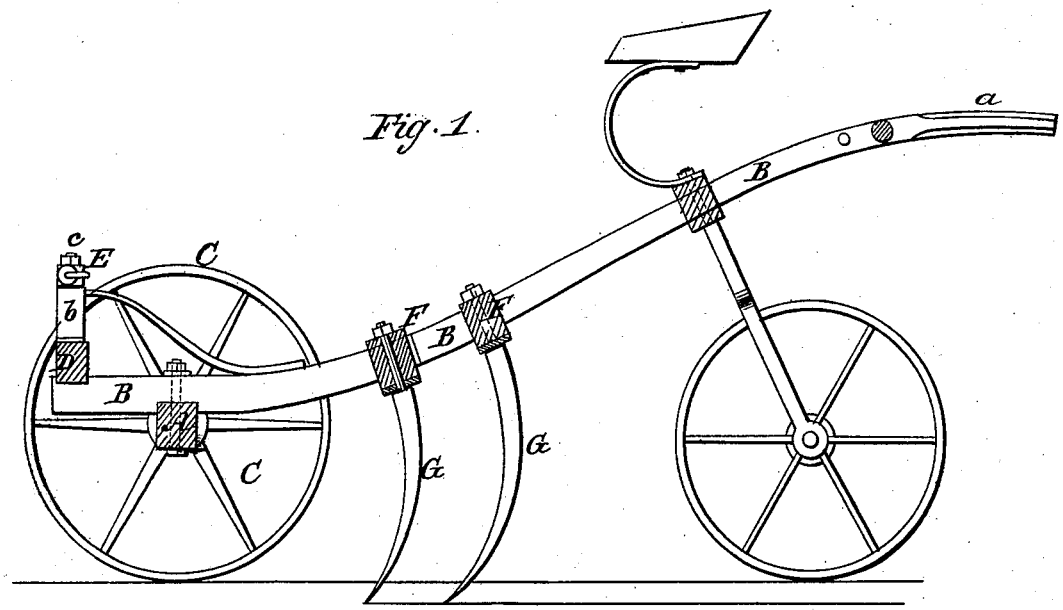
Figure 1 represents a longitudinal vertical section of my improved cultivator.
Figure 2:
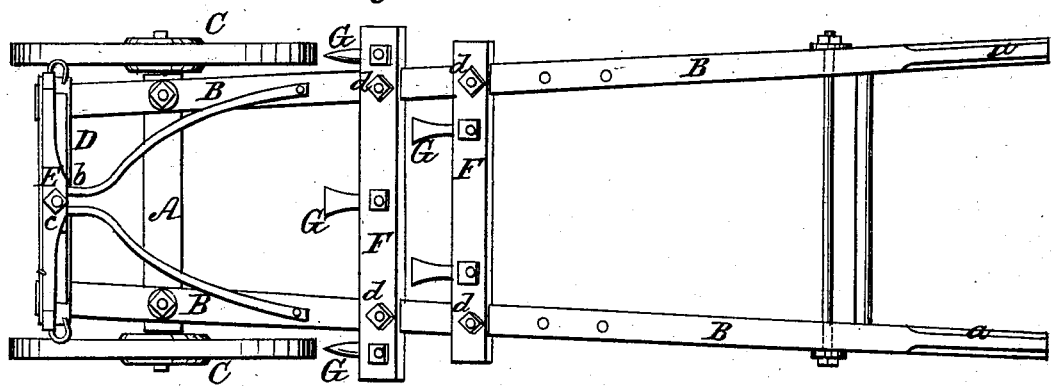
Figure 2 is a plan or top view of the same.

This invention relates to a new instrument for tilling the ground between rows of corn, potatoes, strawberries, onions, or any other suitable plants, and consists in attaching the teeth to bars or heads that are adjustable on and removable from the longitudinal bars of the cultivator-frame, for the purpose of allowing the said heads to be adjusted any desired distance apart, and to allow any desired number of such heads to be put on, in order to have a suitable number of teeth or shovels on the cultivator.

The same can, therefore, be adapted to any suitable kind of work to be done.

A, in the drawing, represents the front axle of my improved cultivator.

It is secured to two longitudinal bars, B B, that may extend backward, to form the handles $a$, as shown.

On the ends of the axle are hung the wheels C.

The bars B are, in front, connected by a cross-bar, D, from which an arm, $b$, projects upward, said arm being well braced, as shown.

E is the whiffle-tree, pivoted, by a pin, $c$, to the upper end of the arm $b$.

The whiffle-tree is thus considerably higher than the axle A.

F F are cross-heads, which are grooved or perforated, so that they can slide on the longitudinal bars B, to which they can be fastened, in any position, by means of bolts $d$, or their equivalents.

These cross-heads can thus be adjusted any desired distance apart, or can be entirely taken off, or any number of them put on.

G G are suitable cutters, shovels, or teeth, fastened, in suitable manner, to the heads F.

The device, in addition to performing the usual functions of a field-cultivator, may also be used for cleaning walks, and weeding, by attaching a horizontal knife to standards projecting from one of the heads F.

In rear may also be arranged, on a sliding cross-bar, a third wheel, and a seat, so that thereby the instrument would be converted into a riding cultivator.

I claim as new, and desire to secure by Letters Patent—

The cross-heads F F, for holding the cultivating-tools, when arranged adjustably on and removable from the longitudinal bars B B, substantially as and for the purpose herein shown and described.

WILLIAM DAY.

Witnesses:
JOHN M. MOORE,
C. V. FREEMAN.